United States Patent
Garcia-Lopez De Victoria et al.

(10) Patent No.: US 7,299,870 B2
(45) Date of Patent: Nov. 27, 2007

(54) SELF DIVERTING MATRIX ACID

(75) Inventors: Marieliz Garcia-Lopez De Victoria, Houston, TX (US); Yenny Christanti, Houston, TX (US); Golchehreh Salamat, Sugar Land, TX (US); Zhijun Xiao, Sugar Land, TX (US); Bernhard Lungwitz, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 151 days.

(21) Appl. No.: 11/292,029

(22) Filed: Dec. 1, 2005

(65) Prior Publication Data

US 2006/0131017 A1   Jun. 22, 2006

Related U.S. Application Data

(63) Continuation-in-part of application No. 10/969,110, filed on Oct. 20, 2004, now Pat. No. 7,237,608.

(51) Int. Cl.
 *E21B 43/25* (2006.01)
(52) U.S. Cl. .................. 166/279; 166/282; 166/307
(58) Field of Classification Search ............ None
 See application file for complete search history.

(56) References Cited

U.S. PATENT DOCUMENTS

| | | | |
|---|---|---|---|
| 4,591,447 A | 5/1986 | Kubala | |
| 4,615,825 A | 10/1986 | Teot et al. | |
| 4,725,372 A | 2/1988 | Teot et al. | |
| 4,735,731 A | 4/1988 | Rose et al. | |
| 5,979,557 A | 11/1999 | Card et al. | |
| 6,258,859 B1 | 7/2001 | Dahayanake et al. | |
| 6,306,800 B1 | 10/2001 | Samuel et al. | |
| 6,435,277 B1 | 8/2002 | Qu et al. | |
| 6,468,945 B1 | 10/2002 | Zhang | |
| 6,667,280 B2 | 12/2003 | Chang et al. | |
| 6,703,352 B2 | 3/2004 | Dahayanake et al. | |
| 6,844,297 B2 | 1/2005 | Allan et al. | |
| 6,881,709 B2 * | 4/2005 | Nelson et al. | 507/203 |
| 6,904,972 B2 | 6/2005 | Zhang et al. | |

OTHER PUBLICATIONS

U.S. Appl. No. 10/969,110—Self Diverting Matrix Acid.

* cited by examiner

*Primary Examiner*—Jennifer H. Gay
*Assistant Examiner*—Kerry W. Leonard
(74) *Attorney, Agent, or Firm*—Darla Fonseca; David Cate; Robin Nava

(57) ABSTRACT

A method is described for treating a subterranean formation with a low viscosity fluid system that contains a surfactant or mixture of surfactants that does not divert fluid flow in the formation, but that develops the ability to divert flow as the fluid flows through the formation. The fluid optionally contains a formation-dissolving agent. The fluid is used in matrix acidizing, acid fracturing, and diversion.

13 Claims, 1 Drawing Sheet

SELF DIVERTING MATRIX ACID

This application is a Continuation in Part of prior application Ser. No. 10/969,110, filed Oct. 20, 2004, now U.S. Pat. No. 7,237,608, entitled "Self Diverting Matrix Acid", hereby incorporated in its entirety.

BACKGROUND OF THE INVENTION

This invention relates to an acidic fluid that becomes a diverting fluid as it is pumped into a subterranean formation. More particularly, it relates to a fluid system—that contains a concentration of a surfactant-containing system that is initially unable to cause the fluid to be a diverting fluid system—that becomes a diverting fluid system as the fluid flows through a permeable subterranean formation. Most particularly it relates to a method of treating a subterranean formation with such a fluid system.

In many oilfield operations there are occasions when it is desirable to pump a fluid that initially flows easily through a formation but then flows with much more difficulty after it has been injected into a borehole (a wellbore) and has progressed a certain distance into the formation. Initially, the ease of flow might be desirable, for example, to reduce the hydraulic horsepower needed for pumping, to facilitate mixing procedures at the surface, or to decrease the resistance to flow of the fluid through the pores of a subterranean formation. Subsequently, more difficult flow might be desired, for example to reduce the flow rate of the fluid through a porous formation or through fractured or lost-circulation zones, for example so that the fluid acts as a diverter. Currently, there are several types of acid systems that are designed to increase in viscosity, but the viscosity increases are dependent upon consumption of some or all of the acid. Some of these systems are polymer-based; polymers may damage formations. Other systems are based on viscoelastic surfactants (VES's) that are much cleaner; however, most VES systems require that the initial fluid contain sufficient surfactant to form a gel, and surfactants may be expensive.

We recently found that certain VES fluid systems can form diverting fluids when injected at concentrations below the concentrations at which they form viscoelastic fluids. It would be desirable to find additional low-viscosity fluids that would increase their resistance to flow after being injected into porous materials.

SUMMARY OF EMBODIMENTS OF THE INVENTION

A method is given for treating a subterranean formation penetrated by a wellbore. The method involves injecting into the formation a treatment fluid containing a viscoelastic surfactant system and an alcohol selected from methanol, ethanol, propanol, and mixtures of these alcohols, at a viscoelastic surfactant concentration (as injected) insufficient to divert fluid flow in the formation. The fluid develops the ability to divert fluids as it flows through the formation. The alcohol is preferably methanol, preferably present in a weight concentration of from about 0.5% to about 2%.

Another embodiment is a method of treating a subterranean formation penetrated by a wellbore involving injecting into the formation a treatment fluid containing an anionic viscoelastic surfactant system at an anionic viscoelastic surfactant concentration as injected) insufficient to divert fluid flow in the formation. The fluid develops the ability to divert fluids as it flows through the formation. The anionic surfactant, for example, is selected from polyalkoxy carboxylic acids, acylated protein hydrolysates, N-acylsarcosinates, alkyl carboxylic acids, cycloalkyl carboxylic acids, aryl carboxylic acids, alkyl phosphates, alkyl thiophosphates, alkyl polyphosphates, ethoxylated phosphate esters, salts of these surfactants, and mixtures of these surfactants. The concentration of the anionic viscoelastic surfactant system, for example, is between about 0.1 and about 10 percent, for example between about 0.25 and about 1 percent. The treatment fluid is, for example, a matrix acidizing fluid, an acid fracturing fluid, or a diversion fluid. The treatment fluid may also contain a formation-dissolving agent.

Yet another embodiment is a method of diverting a fluid injected into a subterranean formation penetrated by a wellbore involving injecting into the formation a non-diverting treatment fluid containing a surfactant system that does not form a viscoelastic fluid (contains only surfactants not considered to be viscoelastic surfactants) and allowing the fluid to become a diverting fluid as it flows through the formation. The concentration of the surfactant system is, for example, between about 0.1 and about 10 percent, for example, between about 0.25 and about 1 percent. The treatment fluid is, for example, a matrix acidizing fluid, an acid fracturing fluid, or a diversion fluid. The treatment fluid may also contain a formation-dissolving agent. The surfactant is selected from alkyl phenols, alkoxylated alcohols, and alkoxy sulfates.

Still another embodiments is a method of treating a subterranean formation penetrated by a wellbore involving injecting into the formation a treatment fluid containing a non-viscoelastic (as injected) mixture of viscoelastic surfactants; the surfactants aggregate into a viscosity-enhancing configuration as the fluid passes through the formation. The mixture contains, for example, one or more zwitterionic surfactants and one or more cationic surfactants. The treatment fluid contains, as another example, a mixture of surfactants that gels at a concentration ratio different from that in the treatment fluid. The treatment fluid contains, as yet another example, a mixture of surfactants that contains an additive, for example polynaphthalene sulfonate, that prevents formation of a gel.

Another embodiment is a method of treating a subterranean formation penetrated by a wellbore involving injecting into the formation a treatment fluid comprising a non-viscoelastic (as injected) mixture of one or more than one viscoelastic surfactant and one or more than one non-viscoelastic surfactant; the surfactants aggregate into a viscosity-enhancing configuration as the fluid passes through the formation.

DETAILED DESCRIPTION OF EMBODIMENTS OF THE INVENTION

Figure 1:
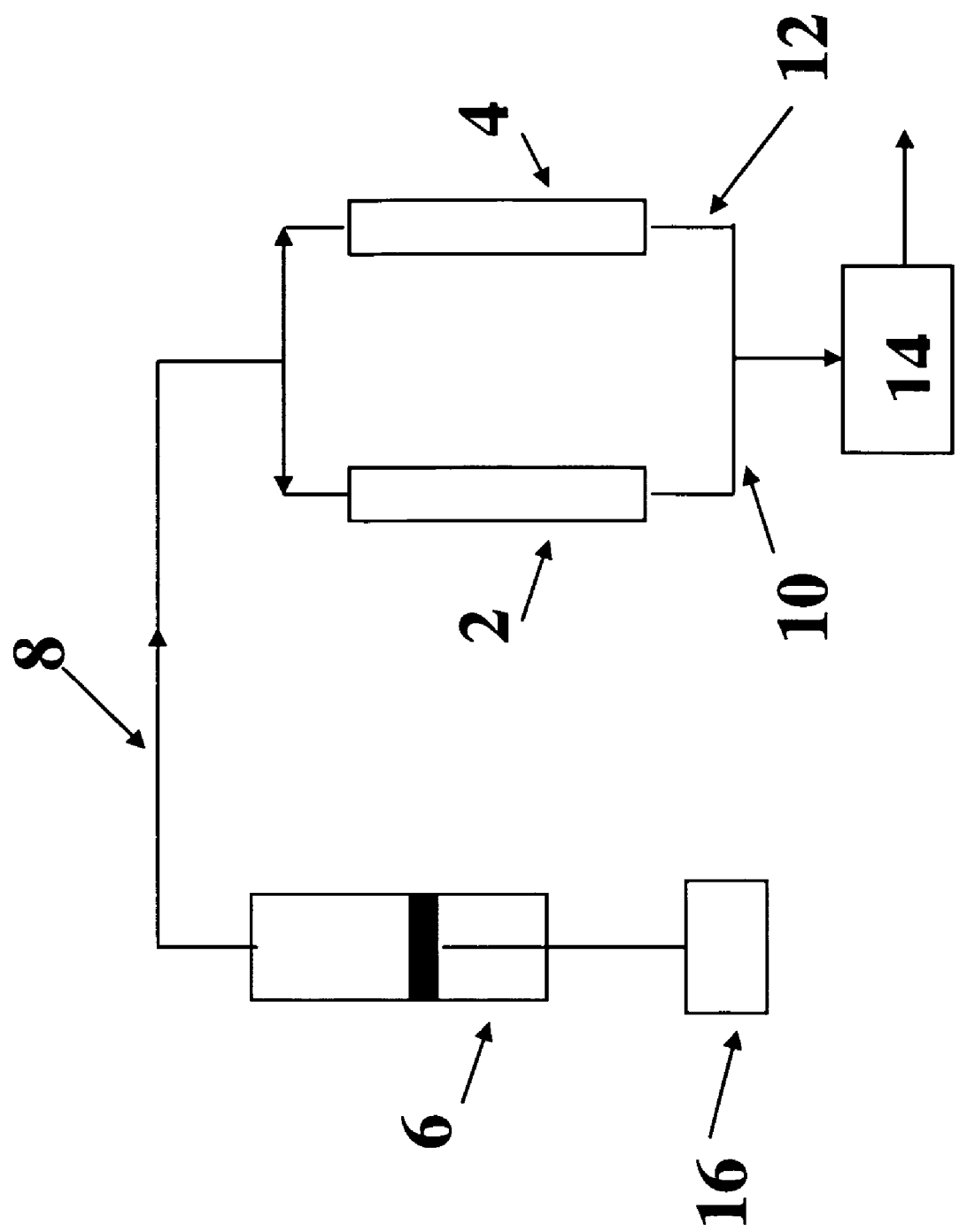
FIG. 1 shows a schematic of the apparatus used for the experiments.

Acid stimulation is a technique widely used to increase production of oil and gas from reservoirs, or to increase injection into reservoirs or into storage. The injected acid dissolves the minerals in the formation and, in carbonates, creates conductive flow channels known as wormholes that facilitate production or injection. The following discussion will consider primarily carbonate reservoirs and injection wells, but it is to be understood that embodiments of the invention will often be applicable to other formations and to other types of wells. When reservoirs with different zones of permeability are treated with acid, the acid flows into the high permeability zones and does not stimulate the low permeability zones; thus it is very desirable for the acid to be self-diverting. To stimulate the low permeability zones, it is valuable to divert the acid from high to low permeability zones. Similarly, when long enough intervals are treated with acid, diversion is needed to prevent a heterogeneous injection profile from resulting. One of the methods used to divert acid involves mixing a viscoelastic surfactant (VES) with the acid prior to injection of the acid into the formation. (A "viscoelastic" surfactant is a surfactant that under certain conditions can aggregate into structures that impart viscoelasticity to a fluid.) Sometimes VES's require, or perform better, when additional components (such as salts, co-surfactants, or organic acids) are present; therefore, VES's when used to viscosify fluids will be called "VES systems" or "VES fluid systems". The viscosity of certain mixtures of acid and certain VES fluid systems depends on the concentration of acid; the viscosity of the mixture is lower when it is strongly acidic and the viscosity increases as the acid spends in the formation. This increase in viscosity causes increased resistance to flow in the high permeability zone, leading to a build-up of pressure that helps in diverting the flow to lower permeability zones. Similarly, in acid fracturing, most often the method of treating sandstones with acid, the growing fracture may encounter or create high-permeability regions through which acid, which is incorporated in the fluid so that it can etch the fracture faces, leaks off into the formation. Avoiding, or at least minimizing, this loss of acid is called leakoff control. At best, this is inefficient and wasteful of acid; at worst, this may reduce or eliminate fracture growth. The same compositions and methods that are used for diversion in matrix treatments may be used for leakoff control in fracturing treatments.

It should be understood that any fluid that dissolves at least portions of a given formation may be used to stimulate or fracture the formation. Normally acids are used and the treatments are called acidizing or acid fracturing. However, other formation-dissolving agents may be used, for example chelating agents for the appropriate minerals, for example aminopolycarboxylic acids or polyaminopolycarboxylic acids. Except when we name specific acids, we intend the term "acid" to include other formation-dissolving agents.

We have previously found (see U.S. patent application Ser. No. 10/969,110) that certain viscoelastic surfactant fluid systems may be used to cause diversion at initial surfactant concentrations much lower than would previously have been thought possible. We define the "initial" concentration or the "initial" fluid as the concentration or fluid that is pumped into the wellbore. As mentioned, a viscoelastic surfactant fluid "system" is defined as the surfactant (or mixture of surfactants) plus any rheology modifiers, salts, co-surfactants, stabilizers, or other additives used to create and affect the viscoelasticity. In U.S. patent application Ser. No. 10/969,110 the process by which the initially low concentration of viscoelastic surfactant fluid system became a diverting fluid was described in terms of the system becoming more viscous, although it was said in that application that that was a non-limiting theory. Here we will describe the process as one in which a low concentration of a surfactant is used in a fluid that initially does not divert fluids in a porous formation but that develops the ability to divert more of the same fluid, or a different fluid, after it has passed through some of the porous formation. We may sometimes ascribe this ability to divert to viscosity or to viscoelasticity, but it is to be understood that we are not limiting the effect to development of viscosity or of viscoelasticity. We have now found additional VES fluid systems that may be used in this way, and other surfactants and surfactant systems, that are not necessarily viscoelastic surfactants or viscoelastic surfactant systems, that may be used in this way.

Not to be limited by theory, when discussing VES's here, when we refer to "viscous", or "viscoelastic", or "gelled" fluids, we mean fluids in which viscoelastic surfactant molecules have aggregated to increase the viscosity. Initial fluids (i.e. before any acid is spent) generally have viscosities below about 50 cP (depending upon the acid content, temperature, shear rate, etc.); gelled fluids generally have viscosities above about 50 cP, for example above 100 cP. Thus, injection of an initial fluid that is not viscous because it contains a viscoelastic surfactant concentration too low to contribute to the initial viscosity of the fluid may nonetheless be used to treat a formation with a "viscous" fluid; in other words, the formation (at least at a distance from the wellbore) is being treated with a fluid more viscous than what is injected. Even if the surfactant is not a viscoelastic surfactant, i. e. not one that is known to form aggregates under certain conditions that increase the viscosity and produce viscoelasticity, certain surfactants have none-the-less been found that behave in the same way, that is they may be injected into a formation under conditions at which they do not provide diversion (for example at a concentration at which they do not provide diversion), but they develop the ability to inhibit fluid flow through porous media as they are flowing through the porous media. That is, they do provide diversion after they have been flowing through a formation. In matrix treatments, for example, this initial fluid system forms wormholes and then creates resistance to flow at or near the tip of the wormhole, causing diversion. In acid fracturing, for example, this initial fluid creates resistance to flow where leakoff is high, and so this fluid system controls leakoff. In the term "surfactant", here, we include certain commercially available surfactants that are obtained as concentrates in mixtures that may contain various other components that may be by-products of manufacture or may function as solvents, stabilizers, diluents, etc.

In U.S. patent application Ser. No. 10/969,110, it was shown that many viscoelastic surfactants may be used this way, but certain cationic surfactants were preferred. Exemplary cationic viscoelastic surfactants include the amine salts and quaternary amine salts disclosed in U.S. Pat. Nos. 5,979,557, and 6,435,277 which have a common Assignee as the present application and which are hereby incorporated by reference.

Examples of suitable cationic viscoelastic surfactants include cationic surfactants having the structure:

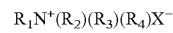

in which $R_1$ has from about 14 to about 26 carbon atoms and may be branched or straight chained, aromatic, saturated or unsaturated, and may contain a carbonyl, an amide, a retroamide, an imide, a urea, or an amine; $R_2$, $R_3$, and $R_4$ are each independently hydrogen or a $C_1$ to about $C_6$ aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5- or 6-member ring structure which includes the nitrogen atom; the $R_2$, $R_3$ and $R_4$ groups may be the same or different; and $X^-$ is an anion. Mixtures of such compounds are also suitable. As a further example, $R_1$ is from about 18 to about 22 carbon atoms and may contain a carbonyl, an amide, or an amine, and $R_2$, $R_3$, and $R_4$ are the same as one another and contain from 1 to about 3 carbon atoms.

Cationic surfactants having the structure $R_1N^+(R_2)(R_3)(R_4) X^-$ may optionally contain amines having the structure $R_1N(R_2)(R_3)$. It is well known that commercially available cationic quaternary amine surfactants often contain the corresponding amines (in which $R_1$, $R_2$, and $R_3$ in the cationic surfactant and in the amine have the same structure). As-received commercially available VES surfactant concentrate formulations, for example cationic VES surfactant formulations, may also optionally contain one or more members of the group consisting of solvents, mutual solvents, organic acids, organic acid salts, inorganic salts, and oligomers, polymers, co-polymers, and mixtures of these members. They may also contain performance enhancers, such as viscosity enhancers, for example polysulfonates, for example polysulfonic acids, as described in copending U.S. Patent Application Publication No. 2003-0134751 which has a common Assignee as the present application and which is hereby incorporated by reference.

Another suitable cationic VES is erucyl bis(2-hydroxyethyl) methyl ammonium chloride, ("EMHAC"), also known as (Z)-13 docosenyl-N-N-bis (2-hydroxyethyl) methyl ammonium chloride. It is commonly obtained from manufacturers as a mixture containing about 60 weight percent surfactant in a mixture of isopropanol, ethylene glycol and water. In this patent, when we refer to "EMHAC" we mean such a solution. Other suitable amine salts and quaternary amine salts include (either alone or in combination in accordance with the invention), erucyl trimethyl ammonium chloride; N-methyl-N,N-bis(2-hydroxyethyl) rapeseed ammonium chloride; oleyl methyl bis(hydroxyethyl) ammonium chloride; erucylamidopropyltrimethylamine chloride, octadecyl methyl bis(hydroxyethyl) ammonium bromide; octadecyl tris(hydroxyethyl) ammonium bromide; octadecyl dimethyl hydroxyethyl ammonium bromide; cetyl dimethyl hydroxyethyl ammonium bromide; cetyl methyl bis(hydroxyethyl) ammonium salicylate; cetyl methyl bis(hydroxyethyl) ammonium 3,4,-dichlorobenzoate; cetyl tris(hydroxyethyl) ammonium iodide; cosyl dimethyl hydroxyethyl ammonium bromide; cosyl methyl bis(hydroxyethyl) ammonium chloride; cosyl tris(hydroxyethyl) ammonium bromide; dicosyl dimethyl hydroxyethyl ammonium bromide; dicosyl methyl bis(hydroxyethyl) ammonium chloride; dicosyl tris(hydroxyethyl) ammonium bromide; hexadecyl ethyl bis(hydroxyethyl) ammonium chloride; hexadecyl isopropyl bis(hydroxyethyl) ammonium iodide; and cetylamino, N-octadecyl pyridinium chloride.

Zwitterionic viscoelastic surfactants are also suitable. Exemplary zwitterionic viscoelastic surfactants include those described in U.S. Pat. No. 6,703,352 which has a common Assignee as the present application and which is hereby incorporated by reference. Exemplary zwitterionic surfactants have the structure:

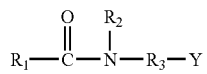

in which $R_1$ is a hydrocarbyl group that may be branched or straight chained, aromatic, aliphatic or olefinic and contains from about 14 to about 26 carbon atoms and may include an amine; $R_2$ is hydrogen or an alkyl group having from 1 to about 4 carbon atoms; $R_3$ is a hydrocarbyl group having from 1 to about 5 carbon atoms; and Y is an electron withdrawing group. More particularly, the zwitterionic surfactant may have the betaine structure:

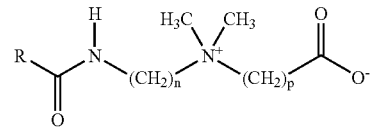

in which R is a hydrocarbyl group that may be branched or straight chained, aromatic, aliphatic or olefinic and has from about 14 to about 26 carbon atoms and may contain an amine; n=about 2 to about 4; and p=1 to about 5. Mixtures of these compounds may also be used.

Two examples of suitable betaines are, respectively, BET-O-30 and BET-E-40. The VES surfactant in BET-O-30 is oleylamidopropyl betaine. It is designated BET-O-30 here, because as obtained from the supplier (Rhodia, Inc. Cranbury, N.J., U.S.A.) it is called Mirataine BET-O-30; it contains an oleyl acid amide group (including a $C_{17}H_{33}$ alkene tail group) and is supplied as about 30% active surfactant; the remainder is substantially water, sodium chloride, glycerol and propane-1,2-diol. An analogous suitable material, BET-E-40, was used in the experiments described below; one chemical name is erucylamidopropyl betaine. BET-E-40 is also available from Rhodia; it contains a erucic acid amide group (including a $C_{21}H_{41}$, alkene tail group) and is supplied as about 40% active ingredient, with the remainder substantially water, sodium chloride, and isopropanol. BET surfactants, and others that are suitable, are described in U.S. Pat. No. 6,703,352.

Certain co-surfactants may be useful in extending the brine tolerance, to increase the gel strength, to reduce the shear rehealing time, and/or to reduce the shear sensitivity of zwitterionic VES fluid systems, such as betaine VES fluids. An example given in U.S. Pat. No. 6,703,352 is sodium dodecylbenzene sulfonate (SDBS). Another example is polynaphthalene sulfonate. Zwitterionic VES's may be used with or without this type of co-surfactant, for example those having a SDBS-like structure having a saturated or unsaturated, branched or straight-chained $C_6$ to $C_{16}$ chain; further examples of this type of co-surfactant are those having a saturated or unsaturated, branched or straight-chained $C_8$ to $C_{16}$ chain. Other suitable examples of this type of co-surfactant, especially for BET-O-30, are certain chelating agents such as trisodium hydroxyethylethylenediamine triacetate. Many suitable additives are known for improving the performance of gelled VES surfactant systems; any may be used in the current invention; they should be tested for compatibility with the compositions and methods of the invention before use; simple laboratory experiments for such testing are well known.

Zwitterionic surfactant viscoelastic systems typically contain one or more members of the group consisting of organic acids, organic acid salts, inorganic salts, and oligomers, polymers, co-polymers, and mixtures of these members. This member is typically present in only a minor amount and need not be present at all. The organic acid is typically a sulfonic acid or a carboxylic acid and the anionic counterion of the organic acid salts are typically sulfonates or carboxylates. Representative of such organic molecules include various aromatic sulfonates and carboxylates such as p-toluene sulfonate, naphthalene sulfonate, chlorobenzoic acid, salicylic acid, phthalic acid and the like, where such counter-ions are water-soluble. Most preferred are salicylate, phthalate, p-toluene sulfonate, hydroxynaphthalene carboxylates, e.g. 5-hydroxy-1-naphthoic acid, 6-hydroxy-1-naphthoic acid, 7-hydroxy-1-naphthoic acid, 1-hydroxy-2-naphthoic acid, preferably 3-hydroxy-2-naphthoic acid, 5-hydroxy-2-naphthoic acid, 7-hydroxy-2-naphthoic acid, and 1,3-dihydroxy-2-naphthoic acid and 3,4-dichlorobenzoate. The organic acid or salt thereof typically aids the development of increased viscosity that is characteristic of preferred fluids. The organic acid or salt thereof is typically present in the zwitterionic viscoelastic fluid (after the viscoelastic surfactant has concentrated sufficiently to viscosify the fluid) at a weight concentration of from about 0.1% to about 10%, more typically from about 0.1% to about 7%, and even more typically from about 0.1% to about 6%.

Inorganic salts that are particularly suitable for use in the zwitterionic viscoelastic fluid include water-soluble potassium, sodium, and ammonium salts, such as potassium chloride and ammonium chloride. Additionally, calcium chloride, calcium bromide and zinc halide salts may also be used. The inorganic salts may aid in the development of increased viscosity which is characteristic of preferred fluids. Further, the inorganic salt may assist in maintaining the stability of a geologic formation to which the fluid is exposed. Formation stability and in particular clay stability (by inhibiting hydration of the clay) is achieved at a concentration level of a few percent by weight. The inorganic salt is typically present in the zwitterionic viscoelastic fluid (after the viscoelastic surfactant has concentrated sufficiently to viscosify the fluid) at a weight concentration of from about 0.1% to about 30%, more typically from about 0.1% to about 10%, and even more typically from about 0.1% to about 8%. Organic salts, e.g. trimethylammonium hydrochloride and tetramethylammonium chloride, may also be used in addition to, or as a replacement for, the inorganic salts. Optionally, these systems may be formed in dense brines, including brines containing polyvalent cations.

As an alternative to the organic salts and inorganic salts, or as a partial substitute therefore, one can use a medium to long chain alcohol (preferably an alkanol), preferably having five to ten carbon atoms, or an alcohol ethoxylate (preferably an alkanol ethoxylate) preferably of a 12 to 16 carbon alcohol and having 1 to 6, preferably 1-4, oxyethylene units.

Amphoteric viscoelastic surfactants are also suitable. Exemplary amphoteric viscoelastic surfactants include those described in U.S. Pat. No. 6,703,352, for example amine oxides. Mixtures of zwitterionic surfactants and amphoteric surfactants are suitable. An example, called BET-E-40/AO here, is a mixture of about 13% isopropanol, about 5% 1-butanol, about 15% ethylene glycol monobutyl ether, about 4% sodium chloride, about 30% water, about 30% cocamidopropyl betaine, and about 2% cocamidopropylamine oxide.

The formation treatment fluid containing a low-concentration of a surfactant (or surfactant concentrate containing other components) that can develop the ability to divert as it flows through a porous medium typically contains a formation-dissolving agent, for example hydrochloric acid, formic acid, acetic acid, lactic acid, glycolic acid, sulfamic acid, malic acid, citric acid, tartaric acid, maleic acid, methylsulfamic acid, chloroacetic acid, aminopolycarboxylic acids, 3-hydroxypropionic acid, polyaminopolycarboxylic acids, for example trisodium hydroxyethylethylenediamine triacetate, and salts of these acids and mixtures of these acids and/or salts. For sandstone treatment, the fluid also typically contains a hydrogen fluoride source. The hydrogen fluoride source may be HF itself or may be selected from ammonium fluoride and/or ammonium bifluoride or mixtures of the two; when strong acid is present the HF source may also be one or more of polyvinylammonium fluoride, polyvinylpyridinium fluoride, pyridinium fluoride, imidazolium fluoride, sodium tetrafluoroborate, ammonium tetrafluoroborate, salts of hexafluoroantimony, and mixtures. When the formation-dissolving agent is a strong acid, the fluid preferably contains a corrosion inhibitor. The fluid optionally contains chelating agents for polyvalent cations, for example especially aluminum, calcium and iron (in which case the agents are often called iron sequestering agents) to prevent their precipitation. Some of the formation-dissolving agents just described are such chelating agents as well. Chelating agents are added at a concentration, for example, of about 0.5% (of active ingredient).

We have now found that anionic viscoelastic surfactants may also be used at initial concentrations below the concentrations at which they form viscoelastic fluids. The anionic surfactant may be employed as the free acid or, for example, as the sodium, potassium, or ammonium salt. Examples of suitable anionic surfactants include polyalkoxy carboxylic acids, acylated protein hydrolysates, N-acylsarcosinates, alkyl carboxylic acids, cycloalkyl carboxylic acids, aryl carboxylic acids, alkyl phosphates, alkyl thiophosphates, alkyl polyphosphates, and ethoxylated phosphate esters.

Further examples of suitable anionic surfactants are carboxylic acids having the generic structure:

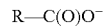

$R-C(O)O^-$ wherein R represents alkyl, alkenyl, arylalkyl, and hydroxyalkyl wherein each of said alkyl groups contains from about 8 to about 24 carbon atoms, more preferably at least 16 carbon atoms, and may be branched or straight chained and saturated or unsaturated, and wherein when branched the branch alkyl groups have from about 1 to about 6 carbon atoms. Representative of alkyl groups for R include decyl, dodecy, tetradecyl (myristyl), hexadecyl (cetyl), octadecyl (oleyl), lauryl, palmityl, stearyl, erucyl, and the derivatives of coco, tallow, soya, and rapeseed oils. Oleyl is particularly preferred. Dimers of unsaturated acids may also be used, such as oleic acid dimer. The R groups may be substituted with other groups provided that these surfactants remain viscoelastic surfactants.

Another suitable class of anionic surfactants is ethoxylated anionic surfactants of the general formula:

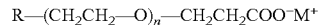

$R-(CH_2CH_2-O)_n-CH_2CH_2COO^-M^+$ having an alkyl chain R of from about 6 to about 30 carbon atoms, that can be straight chained or branched, and saturated or unsaturated, and a value of n from 0 to about 20, preferably less than about 10. The cation is inorganic (for example $K^+$, $Na^+$, and $Cs^+$) or organic (for example quaternary amine). An example is sodium laureth-13 carboxylate, sold by Rhodia, Inc. Cranbury, N.J., U.S.A. under the trade name Miranate LEC-80, and hereinafter referred to as "LEC". LEC has a $C_{12}$ straight chained alkyl group, 13 ethoxy groups and a sodium cation. As received, Miranate LEC-80 is about 79% active ingredient and also contains mixed alcohol and water.

We have in addition found that the diverting effect developed by viscoelastic surfactant fluid systems initially injected below their viscosifying concentrations may be enhanced by the inclusion of small amounts of low molecular weight alcohols. Examples are methanol, ethanol, and propanol, at weight concentrations of from about 0.5% to about 5%, preferably at concentrations of about 1%.

In some cases, mixtures of viscoelastic surfactants that individually would gel, as the acid is depleted, but as a mixture do not (for example because the different surfactants interfere with one another's ability to form viscosity-enhancing structures), may still be useful. An example is a mixture of one or more zwitterionic VES surfactants and one or more quaternary VES surfactants. When mixed, this VES surfactant mixture does not aggregate into viscosity-enhancing configurations. However, when such a mixture flows through a porous medium, resistance to fluid flow may develop. Another useful case is a mixture of surfactants (for example more than one viscoelastic surfactant, or one or more viscoelastic surfactants and one or more non-viscoelastic surfactants) that cannot generate resistance to flow in the concentration ratio in which they are provided but will do so at another ratio or when one or more of the surfactants is removed (which changes result from the mixture interacting with a formation through which it is flowing). Another example is a surfactant or mixture of surfactants, containing an additive (for example polynaphthalene sulfonate), which will generate adequate viscosity if some or all of the additive is removed, allowing generation of resistance to flow.

We have also found that certain surfactant mixtures (including the solvents and other components in the concentrates) that are not normally considered to be viscoelastic surfactants may be used. The following have been used successfully (see the examples below):

Surfactant Mixture A (SMA) (concentrations approximate):
   10-30% acetic acid
   1-5% naphthalene
   10-30% ethylene glycol
   10-30% heavy aromatic petroleum naphtha
   40-60% proprietary emulsifying agent surfactant Surfactant Mixture B (SMB) (concentrations approximate):
   5% methanol
   35% isopropanol
   39% water
   20% poly(oxy-1,2-ethanediyl) nonyl phenol
   0-1% perfluorinated quaternary amine iodide or chloride solution Surfactant Mixture C (SMC) (concentrations approximate):
   20% isopropanol
   20% ethylene glycol monobutyl ether
   30% water
   20% ethoxylated C11 linear/branched alcohols
   10% ethoxylated C12-C15 linear alcohols Surfactant Mixture D (SMD) (concentrations approximate):
   13% ethanol
   15% ethylene glycol monobutyl ether
   17-25% water
   26-51% ammonium C6-C10 alcohol ethoxysulfate
   1% C6-C10 ethoxylated alcohols Mixtures such as those listed directly above are commonly commercially available for various purposes such as dispersants, foaming or non-foaming agents. Wetting or non-wetting agents, and the like. It can readily be determined whether such surfactant mixtures will be suitable for the present invention by experiments such as those detailed below. Non-limiting examples of suitable classes of compounds that are the surfactant ingredients of the mixtures include alkyl phenols, alkoxy phenols, alkoxy alcohols, and alkoxy sulfates. Although testing has not been done, it is believed that suitable carbon chain lengths in the alkyl groups range from about $C_{10}$ to $C_{22}$; that chains may be linear or branched; may be saturated or unsaturated; and may be substituted. Alkoxy groups are usually ethoxy but may be propoxy or mixtures of the two; the number of alkoxy groups preferably ranges from about 1 to about 7.

When the fluids described above, having initially low concentrations of surfactants that will lead to flow diversion, contain formation-dissolving agents, they may be used as the main fluids in matrix treatments, and fracturing treatments. With or without formation-dissolving agents, the fluids may be used as diversion fluids. When used as main fluids or as diversion fluids, injection may be alternated with injection of other fluids, optionally with one stage of each or many stages of each, and the fluids of the invention may optionally be the first fluids injected. For example, injection may be alternated with initially viscous fluids, with (other) diversion fluids, or with (other) main fluids. Optionally other fluids injected may be similar to the fluids of the invention except for the surfactant concentration. Optionally, the fluids may contain fibers, may contain other particulate material such as fluid loss additives, and may be foamed or energized.

The extent to which the surfactant concentrate becomes effective for diversion within the formation during the matrix treatment, fracturing treatment, or diversion treatment depends upon the properties of the formation, for example the temperature, chemical composition and pore structure, and the fluid composition, for example the nature of the surfactant and the nature and concentration of other components, for example salts and formation-dissolving agents. The concentration of surfactant that will lead to diversion in the initial fluid depends upon the volume of formation to be treated, the volume of initial fluid to be injected, the extent to which the surfactant is concentrated during the treatment, and the concentration needed to inhibit flow of the fluid. The initial concentration of surfactant that will lead to diversion is generally from about 0.1% to about 10%, for example from about 0.25% to about 1%. It should be understood that an initial concentration of a first surfactant that will lead to diversion when it is in one fluid might be insufficient to lead to diversion when it is in another fluid, while the same concentration of another surfactant, or of the first surfactant under other conditions, might be sufficient. Therefore, the appropriate concentration of a given surfactant in the present invention could be the same as, or even more than, the concentration of that surfactant reportedly used under other conditions as a viscosifying agent or for other purposes. The underlying concept is that the initial concentration used in the method of the present invention is insufficient, under the initial conditions of use, to cause diversion, but the fluid will cause diversion after the fluid has flowed through some of the formation.

Matrix acidizing and acid fracturing are typically undertaken to provide improved flow paths for the production of hydrocarbons, but the method is equally useful in wells for the production of other fluids (such as water or helium) or for injection wells (for example for enhanced oil recovery or for disposal).

EXAMPLES

Surfactant/acid systems were tested for diverting capability using a dual core apparatus. A schematic of the apparatus used is shown in FIG. 1. The apparatus consists of two cores [2] and [4] in holders, a high permeability core and a low permeability core. The two cores were connected to an accumulator [6] containing acid that was displaced by a piston into a single fluid line [8] connected to the two core holders. The exit fluid lines of the core holders, [10] and [12], were connected to a backpressure regulator [14] that was maintained at 1200 psi (8.27 MPa). Acid was injected into the cores at a constant injection rate (2.5 ml/mn for most cases) until it broke through one of the cores. Unless stated otherwise, the acid always broke through the high permeability core. The effectiveness of the acid in diverting the fluid to the low permeability zone was determined by measuring the length of the wormhole formed in the low permeability core. Laboratory tests were conducted using this dual core apparatus with pairs of cores having different permeability contrasts.

The data obtained are reported in Tables 1, 2 and 3. In the tables, the surfactants EMHAC, and BET-E-40 were as received materials as described above. Cat A, Cat B, and Cat C, were three cationic surfactant formulations containing the same cationic surfactant $R_1N^+(R_2)(R_3)(R_4)\ X^-$ (in which $R_1$ has from about 18 to about 22 carbon atoms and contains an amide; $R_2$, $R_3$, and $R_4$ are the same short-chained saturated alkyl group, and $X^-$ is a halide). Cat A, Cat B, and Cat C, contain differing choices and amounts of the types of additives commonly obtained in commercially available as-received surfactant concentrates. SMA was a commercial surfactant mixture obtained as AQUET® 942 from Baker Petrolite, Sugar Land, Tex., U.S.A. Corrosion inhibitor A was a mixture of about 10% formic acid, about 25% isopropanol, about 35% cinnamaldehyde, about 15% benzyl quinolinium chloride, and about 15% of a mixture of ethoxylated $C_{11}$ linear and branched alcohols. Corrosion inhibitor B was a mixture of about 25% formic acid, about 10% of a mixture of methanol and isopropanol, about 8% water, about 25% naphthyl methyl quinolinium chloride, about 10% ethoxylated tridecyl alcohol, about 8% 3-methoxy-2-benzoyl-1-propene, and about 1% to about 3% each of a number of other amines, acids, alcohols, ketones and ethers. Corrosion inhibitor C was a mixture of about 35% methanol, about 5% propargyl alcohol, and about 60% of a proprietary organic mixture. Corrosion inhibitor D was 85% formic acid in water. Corrosion inhibitor E was a mixture containing from about 1 to about 12% each of formaldehyde, acetic acid, methanol, isopropanol, acetophenone, dimethylcyclohexylamine, propargyl alcohol, 3-hydroxy-1-phenyl-1-propanone, ethyloctynol, water, ethoxylated tall oil fatty acids, benzoyl allyl alcohol, 1,3-dimethoxy-2-benzoylpropane, an amine/formaldehyde polymer, ethoxylated tridecyl alcohol, and 24% 3-methoxy-2-benzoyl-1-propene.

In the Tables, K is the core permeability, Q is the flow rate, the temperatures are in degrees Centigrade, and the core lengths are shown in cm. The column labeled "Wormhole" shows the penetration of the fluid into the lower permeability core when the fluid broke through the higher permeability core.

Table 1 shows the results with 0.5% CAT A in 15% HCl, a concentration at which the CAT A does not gel in this fluid system. It can be seen that in relatively low permeability cores, there was clearly diversion of flow from the higher permeability core to the lower permeability core in each experiment, because there was substantial penetration of fluid into the lower permeability core before the fluid broke through in the higher permeability core. In the medium permeability experiments, the effect was even greater; in most cases, penetration into the lower permeability core was almost as great as into the higher permeability core. In the one experiment with high permeability cores, the diversion was excellent; in fact, breakthrough occurred first in the lower permeability core.

Table 2 shows results with various other fluids. (Except for the one experiment for which an HCl concentration of 20% is shown, all the initial fluids in the experiments of Table 2 contained 15% HCl.) Although criteria vary, the first and fourth experiments in Table 2 would have been considered by most people skilled in the art to have been gelled as pumped. It can be seen that Cat A, Cat B, and Cat C were all effective. It can also be seen that a mixture of a zwitterionic surfactant and an amphoteric surfactant (BET-E-40/AO) was effective.

The fluids designated "2PV SDA" and "1PV SDA" represent passing two pore volumes and one pore volume, respectively, of a self-diverting polymer-based acid through the dual-core system. The self-diverting polymer-based acid system was made by mixing 3% of an approximately 35% cationic polyacrylamide solution, 5% HCl, 1% of an about 33% hydrazinium chloride solution, 0.5% of about 40% ferric chloride, 0.4% of a corrosion inhibitor, and 1% of 85% formic acid. (The hydrazinium chloride reduces the ferric ion to ferrous ion, that crosslinks the polymer, only after the fluid pH increases above about 2 as the acid is spent; when the pH goes above about 3.5 the crosslinking is reversed.) After the injection of the self-diverting polymer-based acid, the cores were flushed with 15% HCl containing 0.4% corrosion inhibitor A. Although there was diversion, the self-diverting polymer-based acid was not as effective as many of the embodiments of the present invention. Also, not shown is that measurement of the pressure drops across the cores (with 2% KCl) after the treatments showed that the permeabilities after treatment with suitable surfactant systems of the invention were always grater than the permeabilities after treatment with self-diverting polymer-based acid. The self-diverting polymer based fluid damaged the cores; the surfactant-based systems did not.

In a separate experiment, not shown, when an HCl solution containing no surfactant was injected into three cores in parallel, all of the HCl solution entered the highest permeability core.

Table 3 shows additional dual-core test results. The data clearly show that when the anionic VES surfactant oleic acid, or non-VES surfactant concentrates SMA, SMB, SMC, or SMD are injected at very low concentration into dual cores of different permeability, in each case wormhole is observed in the lower permeability core. In the last experiment listed in Table 3, corrosion inhibitor B was introduced as a mixture that was 80% corrosion inhibitor B and 20% diesel.

TABLE 1

0.5% Cat A + 15% HCl

| Temp | K1 (mD) | K2 (mD) | K1/K2 | Q (ml/min) | CoreLength | Corro. Inhib. | Wormhole |
|---|---|---|---|---|---|---|---|
| | | | | Low Permeability | | | |
| 93.3 | 30 | 2.6 | 12 | 1 | 30.5 | 0.4% A | Conical-50% each |
| 93.3 | 17 | 1.6 | 11 | 2.5 | 30.5 | 0.4% A | 60% |
| 93.3 | 22 | 1.2 | 18 | 2.5 | 15.2 | 0.4% A | 50% |
| 121.1 | 40 | 1 | 40 | 2.5 | 15.2 | 0.4% A | 10% |
| 93.3 | 30 | 2 | 15 | 2.5 | 30.5 | 0.4% B | 8% |

TABLE 1-continued 0.5% Cat A + 15% HCl

| Temp | K1 (mD) | K2 (mD) | K1/K2 | Q (ml/min) | CoreLength | Corro. Inhib. | Wormhole |
|---|---|---|---|---|---|---|---|
| 93.3 | 15 | 2.2 | 7 | 2.5 | 30.5 | 0.4% C | 50% |
| | | | | Medium Permeability | | | |
| 93.3 | 50 | 24 | 2 | 2.5 | 15.2 | 0.4% A | 75% |
| 93.3 | 45 | 6.3 | 7 | 2.5 | 30.5 | 0.4% A | 30% |
| 121.1 | 17 | 12 | 1 | 2.5 | 30.5 | 0.4% A | 83% |
| 121.1 | 96 | 10 | 10 | 2.5 | 30.5 | 0.4% A | 83% |
| | | | | High Permeability | | | |
| 121.1 | 260 | 173 | 2 | 2.5 | 15.2 | 0.4% A | Breakthrough in core 2; core 1 75% |

TABLE 2

| Fluid | Temp | K1 (mD) | K2 (mD) | K1/K2 | Q (ml/mn) | Core Length | Wormhole |
|---|---|---|---|---|---|---|---|
| 5% BET-E-40 + 0.3% B + 1% MeOH | 93.3 | 25 | 1 | 25 | 1 | 30.5 | 25% |
| 1% BET-E-40 + 0.3% B + 1% MeOH | 93.3 | 28 | 2.3 | 12 | 2.5 | 30.5 | 8% |
| 2% BET-E-40 + 0.5% Cat A + 0.4% A + 1% MeOH | 93.3 | 25 | 2 | 13 | 2.5 | 30.5 | 8% |
| 2% BET-E-40 + 0.5% Cat A + 0.4% A | 93.3 | 34 | 2 | 17 | 2.5 | 30.5 | 33% |
| 0.75% BET-E-40 + 0.3% B + 1% MeOH | 93.3 | 45 | 2 | 23 | 2.5 | 30.5 | 8% |
| 0.5% EMHAC + 20% HCl + 0.3% B + 1% D | 93.3 | 48 | 7 | 7 | 2.5 | 30.5 | 12% |
| 0.5% Cat B + 0.3% A | 93.3 | 144 | 68 | 2 | 2.5 | 30.5 | 83% |
| 2 PV SDA + 0.4% A | 93.3 | 152 | 8 | 19 | 2.5 | 30.5 | 17% |
| 1 PV SDA + 0.4% A | 93.3 | 118 | 16 | 7 | 2.5 | 30.5 | 17% |
| 0.5% BET-E-40/AO + 0.4% A | 93.3 | 141 | 17 | 8 | 2.5 | 30.5 | 67% |
| 0.5% Cat C + 0.3% A | 93.3 | 64 | 17 | 4 | 2.5 | 30.5 | 100% |

TABLE 3

| Fluid | K1 (mD) | K2 (mD) | K1/K2 | Flow Rate (ml/min) | Core Length (cm) | Wormhole % |
|---|---|---|---|---|---|---|
| 0.5% Cat B; 0.4% A | 133 | 28 | 5 | 2.5 | 14.7 | 43 |
| 0.5% Oleic Acid; 0.4% A | 184 | 15 | 13 | 2.5 | 15.2 | 100 |
| 0.5% SMC; 0.4% A | 15 | 2.2 | 6.7 | 2.5 | 15.2 | 8 |
| 0.5% SMD; 0.4% A | 16 | 1.83 | 9 | 2.5 | 15.2 | 8 |
| 0.5% SMB; 0.4% A | 16 | 2.9 | 6 | 2.5 | 15.2 | 8 |
| 1.0% SMD; 0.4% A | 12.9 | 2.49 | 5 | 2.5 | 15.2 | 8 |
| 0.6% SMA; 0.6% E | 10.9 | 2.9 | 4 | 2.5 | 15.2 | 42 |
| 0.6% SMA; 0.4% A | 13.7 | 1.75 | 8 | 6 | 15.2 | 17 |
| 0.6% SMA; 0.4% B/Diesel | 16.5 | 2.34 | 7 | 2.5 | 15.2 | 8 |

Note:
Oleic Acid contained 10% Acetic Acid

What is claimed is:

1. A method of diverting a fluid injected into a subterranean formation penetrated by a wellbore comprising injecting into said formation a non-diverting treatment fluid comprising a surfactant system that does not form a viscoelastic fluid and allowing said fluid to become a diverting fluid as it flows through said formation, wherein said surfactant is selected from the group consisting of alkyl phenols, alkoxylated alcohols, and alkoxy sulfates.

2. The method of claim 1 wherein the concentration of said surfactant system is between about 0.1 and about 10 percent.

3. The method of claim 2 wherein the concentration of said surfactant system is between about 0.25 and about 1 percent.

4. The method of claim 1 wherein said treatment fluid is a matrix acidizing fluid.

5. The method of claim 1 wherein said treatment fluid is an acid fracturing fluid.

6. The method of claim 1 wherein said treatment fluid is a diversion fluid.

7. The method of claim 1 wherein said treatment fluid further comprises a formation-dissolving agent.

8. A method of treating a subterranean formation penetrated by a wellbore according to claim 1 comprising injecting into said formation a treatment fluid comprising a non-viscoelastic mixture of viscoelastic surfactants that aggregates into a viscosity-enhancing configuration as the fluid passes through the formation.

9. The method of claim 8 wherein said mixture comprises one or more zwitterionic surfactants and one or more cationic surfactants.

10. The method of claim 8 wherein said treatment fluid comprises a mixture of surfactants that gels at a concentration ratio different from that in said treatment fluid.

11. The method of claim 8 wherein said treatment fluid comprises a mixture of surfactants that comprises an additive that prevents formation of a gel.

12. The method of claim 11 wherein said additive is a polynaphthalene sulfonate.

13. A method of treating a subterranean formation penetrated by a wellbore according to claim 1 comprising injecting into said formation a treatment fluid comprising a non-viscoelastic mixture of one or more than one viscoelastic surfactant and one or more than one non-viscoelastic surfactant that aggregates into a viscosity-enhancing configuration as the fluid passes through the formation.

* * * * *